(12) United States Patent
Hesse (10) Patent No.: US 9,971,141 B2
(45) Date of Patent: May 15, 2018

(54) SIGHTING TELESCOPE WITH OPTIMIZED EXIT PUPIL

(75) Inventor: Helke Karen Hesse, Giessen (DE)

(73) Assignee: Schmidt & Bender GmbH & Co. KG, Biebertal/Fellingshausen (DE)

( * ) Notice: Subject to any disclaimer, the term of this patent is extended or adjusted under 35 U.S.C. 154(b) by 1002 days.

(21) Appl. No.: 13/406,682

(22) Filed: Feb. 28, 2012

(65) Prior Publication Data

US 2012/0224258 A1    Sep. 6, 2012

(30) Foreign Application Priority Data

Mar. 2, 2011 (DE) .................. 10 2011 001 044

(51) Int. Cl.
   *G02B 23/00* (2006.01)
   *F41G 1/38* (2006.01)

(52) U.S. Cl.
   CPC ............. *G02B 23/145* (2013.01); *F41G 1/38* (2013.01)

(58) Field of Classification Search
   CPC ................................ G02B 23/145; F41G 1/38
   USPC ........................................................ 359/428
   See application file for complete search history.

(56) References Cited

U.S. PATENT DOCUMENTS

| 3,640,621 | A | * | 2/1972 | Frerson ................ G03B 21/118 |
| | | | | 353/77 |
| 3,967,876 | A | * | 7/1976 | Steck, III ...................... 359/423 |
| 4,826,292 | A | * | 5/1989 | Spohr et al. ................... 359/707 |
| 5,748,994 | A | * | 5/1998 | Kai ..................... G02B 27/646 |
| | | | | 348/E5.046 |
| 7,835,076 | B2 | * | 11/2010 | Roorda ............. G01N 21/6458 |
| | | | | 359/387 |
| 8,749,884 | B2 | † | 6/2014 | Jahromi |
| 2005/0018731 | A1 | * | 1/2005 | Paradis ..................... G01J 1/04 |
| | | | | 372/50.1 |
| 2008/0062514 | A1 | | 3/2008 | Chang et al. |
| 2010/0238542 | A1 | * | 9/2010 | Fiedler ................... G02B 23/00 |
| | | | | 359/422 |
| 2011/0271576 | A1 | * | 11/2011 | Jahromi ................... F41G 1/38 |
| | | | | 42/122 |

FOREIGN PATENT DOCUMENTS

| DE | 20 2006 020736 | | 4/2006 |
| DE | 10 2006 026419 | | 6/2006 |
| DE | 102006026419 | A1 * | 12/2007 |
| DE | 20 2008 012601 | | 11/2008 |
| DE | 202008012601 | U1 * | 11/2008 |

OTHER PUBLICATIONS

Zeiss, "Target Optics", DE 202008012601 U1, English translation.*
Kammans, "Riflescope Eyepiece with Widely Divergent Exit Pupil", DE 102006026419 A1, English translation.*

* cited by examiner
† cited by third party

Primary Examiner — Bumsuk Won
Assistant Examiner — Wen Huang
(74) Attorney, Agent, or Firm — Clark & Brody (57) ABSTRACT

Regarding a sighting telescope comprising an objective and a reversing system, a first and second image planes respectively being configured between the objective and the reversing system and on a reversing system's side facing away from the objective, where an intermediate image projected by the objective into to the first image plane is reproduced into the second image plane, the invention stipulates an optical unit situated on the reversing system's side away from the objective to make visible the intermediate image in the second image plane.

19 Claims, 6 Drawing Sheets

SIGHTING TELESCOPE WITH OPTIMIZED EXIT PUPIL

The present invention relates to a sighting telescope defined in the preamble of claim 1.

Sighting telescopes are used in hunting and by the military to aim weapons at targets a large distance away. For that purposes these sighting telescopes are fitted with a lens system which is received within a housing and enlarges the targeted object. The (lens) objective is in the form of a collecting optical unit optically imaging the targeted object and the ocular is a plurality of lens elements allowing the human eye to look into said lens system.

An intermediate image is projected from the objective into a first image plane situated relatively near this objective and is reproduced on an enlarged scale in a second image plane relatively near the ocular. Substantial magnifications permit only restricted fields of view that, especially as regards short distances, preclude viewing relatively large image areas. In order to incorporate also these targets, the state of the art offers the principle of variable magnification, i.e. the zoom lens. In such sighting telescopes, the target imaged is inverted on said objective-near first imaging plane and also being upside down, and therefore require being erected/reversed. Accordingly a reversing system is used within the sighting telescope to appropriately reverse/erect.

Frequently the reversing system also allows variably magnification by displacing usually two lens elements in defined manner, respectively being axially independent. Said lens elements include single lenses and single lenses cemented to each other. This design allows erecting an intermediate image produced in the first image plane near the objective, being magnified in the second image plane where it is being observed.

Lastly further lens elements may be used to correct diverse image defects in the sighting telescope, for instance achromats to eliminate chromatic aberrations. A so-called reticle, for instance a crosshair, may be configured in the first or second image plane to aim the weapon at a target.

The above sighting telescope incurs the drawback that the exit pupil is a function of the entrance pupil and of the magnification that was set. The entrance pupil is the stop's image on the objective side, the maximal size of this image being the objective's inside diameter. The resultant exit pupil is the stop's image on the side of the ocular and it may be maximally as large as the objective diameter divided by value of the magnification. Therefore, when increasing the magnification of the sighting telescope, the exit pupil at the ocular will decrease. Given an objective diameter of 50 mm and a magnification of 25, the maximum exit pupil will be 2 mm. The smaller the exit pupil, the more accurately the marksman's eye must be in alignment with this exit pupil.

As regards the marksman, a small exit pupil means on one hand that locating same is not easy. In particular in close combat situations, this drawback is substantial because the marksman cannot aim at the target until his eye has been properly positioned relative to this exit pupil. On the other hand, especially concerning high magnification sighting telescopes and their corresponding small field of view, the sensitivity to sighting telescope motion is very high, and smooth/calm aiming is possible in such a case only when the weapon rests on a support. As regards the human eye with a maximum pupil 7 mm in diameter exit pupils less than 2 mm already are considered very small.

Moreover highly magnifying sighting telescopes of the state of the art require very large objective diameters in order to allow exit pupils of adequate size. These considerations entail a sighting telescope that is big, heavy and hard to handle. Also, large objectives are undesirable in military operations due to being visible from large distances. Again, the costs of material(s) for the sighting telescope housing and the lens elements increase as size increases.

Accordingly the purpose of the present invention to make the exit pupil as large as possible and preferably being independent of the adjusted magnification of a sighting telescope, the design of this invention reducing its mechanical complexity and being feasible at low cost. This sighting telescope also shall be simple and easily handled and offer long service life.

Regarding a sighting telescope comprising an objective and a reversing system, where a first image plane is situated between the objective and the reversing system and where an intermediate image projected by the objective onto the first image plane is reproduced erected in the second image plane, the present invention stipulates an optical unit that is situated on the reversing system side away from the objective and that makes visible the intermediate image in the second image plane.

Such an optical unit is designed to make visible the intermediate image present in the second image plane. This goal is attained in one embodiment mode of the invention of said optical unit using a matte, for instance etched or ground, plate, and the principle of back projection. The optical unit allows the marksman to directly view the image on the optical unit. Accordingly the marksman no longer needs moving his eye directly/accurately in front the sighting telescope, instead he also may look at it at an angle, or outside the optic axis, on the optical unit. As a result he is enabled to acquire a target much more quickly. In such a design, the sighting telescope may be built from simple parts and is commensurately more economical. Mechanical complexity is not increased or only insignificantly, and reliable operation of the sighting telescope of the invention is assured under the most diverse operating conditions. Moreover, the sighting telescope is simple and easily operated.

Besides an objective lens element, typical objectives also are fitted with an objective achromat configured on the objective lens side pointing to or away from the reversing system. As a result, chromatic aberrations may be precluded which otherwise would arise on account of different indices of refraction of the various light wavelengths. Further, the objective may be fitted with a second objective achromat configured on the objective's side facing the reversing system.

Preferably the optical unit will be configured in the second image plane, such a position being optimally suited to make visible a high-quality image by means of the optical unit. However additional lens elements in or at the second image plane in the sighting telescope may require that the optical unit be precluded from assuming said position. In such a case, the optical unit shall be configured as closely as possible to the second image plane.

Moreover a reticle may be configured in the sighting telescope's first image plane. Alternatively too, the optical unit is fitted with a reticle. Illustratively such a reticle may be cemented to the remainder of the optical unit. To also enable operation at dusk or in the dark, the reticle also may be illuminated. The marksman is enabled in this manner to accurately aim at a target under various operational conditions.

In an especially advantageous embodiment mode of the present invention, the reversing system is fitted with a first lens element and a second lens element, the former preferably being displaceable in the reversing system at its objective side and the latter being configured displaceably on the sides of the second reversing system's image plane, as a result of which the intermediate image projected into the first image plane is reproduced at variable magnification into the second image plane. In spite of the different magnification settings, the marksman need not mandatorily position his eye accurately in front of the sighting telescope. The intermediate image present in the second image plane is made visible by the optical unit regardless of magnification. Accordingly the marksman operating at large magnifications has a much easier task both to set his sight on the target and to observe this target over a substantial time interval. Such advantages apply in particular to a 6-fold, preferably larger than 10-fold, and specially preferred larger than 15-fold zoom setting.

One embodiment mode of the invention stipulates that a field lens be configured between the first lens element and the first image plane. This field lens concentrates a beam, so that a center tube of the of the field glass be slenderer, for instance reduced to a diameter of 1", 30 mm or 34 mm. The sighting telescope accordingly is more compact, more elegant, and easy to handle. In particular adjusting turrets to set the sighting telescope do not unduly protrude from the center tube.

Moreover a correcting field lens element may be configured between the first image plane and the field lens, preferably said correcting field lens element being situated at the first image plane. Such a correcting field lens element allows correcting image defects and accordingly a clear, sharp, chromatically corrected image, bright to the edges, may be generated for the marksman. This design of the invention allows cementing a reticle to the correcting field lens element, provided such a reticle be situated in the first image plane. Cemented lens elements are advantageous regarding assembling and the number of needed fasteners. Also a cemented sub-assembly is impervious to soiling.

It was found advantageous, especially for large-zoom sighting telescopes, to configure a beam deflecting/diverging unit between the second lens element and the second image plane, said beam deflecting unit preferably being in the form of a diverging lens. It also may be two or more lens elements cemented to one another and offering chromatic properties. Such a lens element increases the sighting telescope's magnification while keeping its bulk constant. Illustratively the beam-deflecting unit might be a Barlow lens. Again, the beam deflecting unit as well as the lens elements may be axially displaceable. However, a fixed beam deflecting unit increases the mechanical complexity much less.

Another alternative embodiment mode stipulates that the reversing system be in the form of a fiber optics running from the first image plane to the second one. While the fiber optics precludes variable magnification within the reversing system, on the other hand the image on the second image plane is very bright and clear. As a result, the image made visible by the optical unit in the second image plane also is very bright and contrasty.

In especially preferred manner, an ocular is configured on the second image plane's side away from the reversing system. This ocular magnifies the image made visible by the optical unit. The ocular offers the substantial advantage to allow better observation of the image made visible by the optical unit. The image rendered visible by the optical unit being of the same constant diameter regardless of the selected magnification, the ocular's exit pupil also is of the same diameter. As a result, the requirements incurred in positioning the eye relative of the ocular are independent of the selected magnification. The ocular magnification makes it possible to sight easily and rapidly even targets a far distance away and to observe them over a substantial time interval.

Besides an ocular lens element, the ocular also may be fitted with an ocular achromat, the latter being configured on the ocular lens' side pointing to or away from the reversing system. Such an ocular achromat also may reduce chromatic aberrations which otherwise are caused by different indices of refraction of the various light wavelengths.

Another embodiment mode of the present invention stipulates that the optical unit subtend an angle of emitted radiation, as a result of which the numerical aperture of the intermediate image present in the second image plane is larger than the numerical aperture on the side of the reversal system. Preferably the radiation angle is large enough that the numerical aperture pointing away from the reversing system is equal to or larger than a numerical aperture of the adjacent ocular, and this in especially preferred manner also at the maximum magnification of the sighting telescope. In this design the exit pupil is a maximum for the ocular used, and consequently the eye may be positioned in front of the ocular in very simple manner. A target may be very conveniently sighted by the marksman and be observed for extended time intervals even at large magnifications. However brightness degradation due to the radiation angle may require that the exit pupil not be widened to the radiation angle. Even partial widening already offers a large advantage.

In another embodiment mode the invention, the optical unit is fitted with a diffuser. Such a diffuser scatters light to make visible the intermediate image in the second image plane. Depending on the intensity of diffusion, the radiation angle may be designed in particular in such manner that the exit pupil shall be large while image quality shall be still attained.

The diffuser may be a matte plate fitted with a first plane, matte surface and a second plane polished surface. Such a matte plate is easily manufactured and production costs are commensurately low. Such matte plates also are often called diffusing plates. Ideally the matte plate is configured perpendicularly to the optic axis.

Especially high image quality is attained when the first surface is configured in the second image plane. Preferably the first surface is made by etching or grinding or using a microstructure. Such a microstructure illustratively may be a specially made micro-honeycomb structure.

In another design of the invention, the second surface is configured in the second image plane's side away from the reversing system. This feature imparts high quality to the image on the matte side. Further, the second image plane is not displaced, allowing retrofitting optical units already designed. The significance here is that components made with previously extant tools will be compatible. As a result, the sighting telescope manufacturing costs are minimal because fewer new tools are required for fine mechanical tools.

In another design of the invention, the diffuser is a holographic part. Such a diffuser is appropriate to make visible a very bright and contrasty image. Also such a diffuser offers a very accurately defined emission pattern leading to high image quality.

Another additional component may be an image amplifier which is situated between the second image plane and the optical unit. Predominantly image intensifiers are electron tubes amplifying low light levels, so that, even in the case of low light intensity, for instance at dusk, the optical unit makes visible a bright image.

Furthermore a fiber optics may be configured between the second image plane and the optical unit, this fiber optics being tangent to the second image plane on the side away from the reversing system. A fiber optics is an optical element consisting of many mutually parallel fibers acting as light guides. Most of these fibers are fused together into a mechanically homogeneous block. Due to the fiber optics, the input-side image of the second image plane corresponds to the image on the back side of the fiber optics. Accordingly the fiber optics is situated in the second image plane. However the exit side image plane also might be stated being the third image plane. The image of the second image plane is then made visible behind the fiber optics by the optical unit. Such a fiber optics in particular make possible very small sizes and/or high light intensities.

Furthermore the optical unit also may be fitted with a beam splitter. In this application the beam splitter may be fitted on the side of the second image plane with a diffuse resp. matte surface. In that case the beam splitter so to speak is then a thick matte plate designed as a beam splitter. This beam splitter may serve to reflect a target mark or other data into the sighting telescope.

Lastly a Fresnel lens also may be situated on the optical unit's side facing or pointing away from the reversing system. Fresnel lenses are sub-divided into annular steps, as a result of which there is significant reduction of weight and volume, especially for short-focal length lens elements.

Further features, details and advantages of the present invention are defined in/follow from the claims and the discussion below in relation to the appended drawings.

Figure 1:
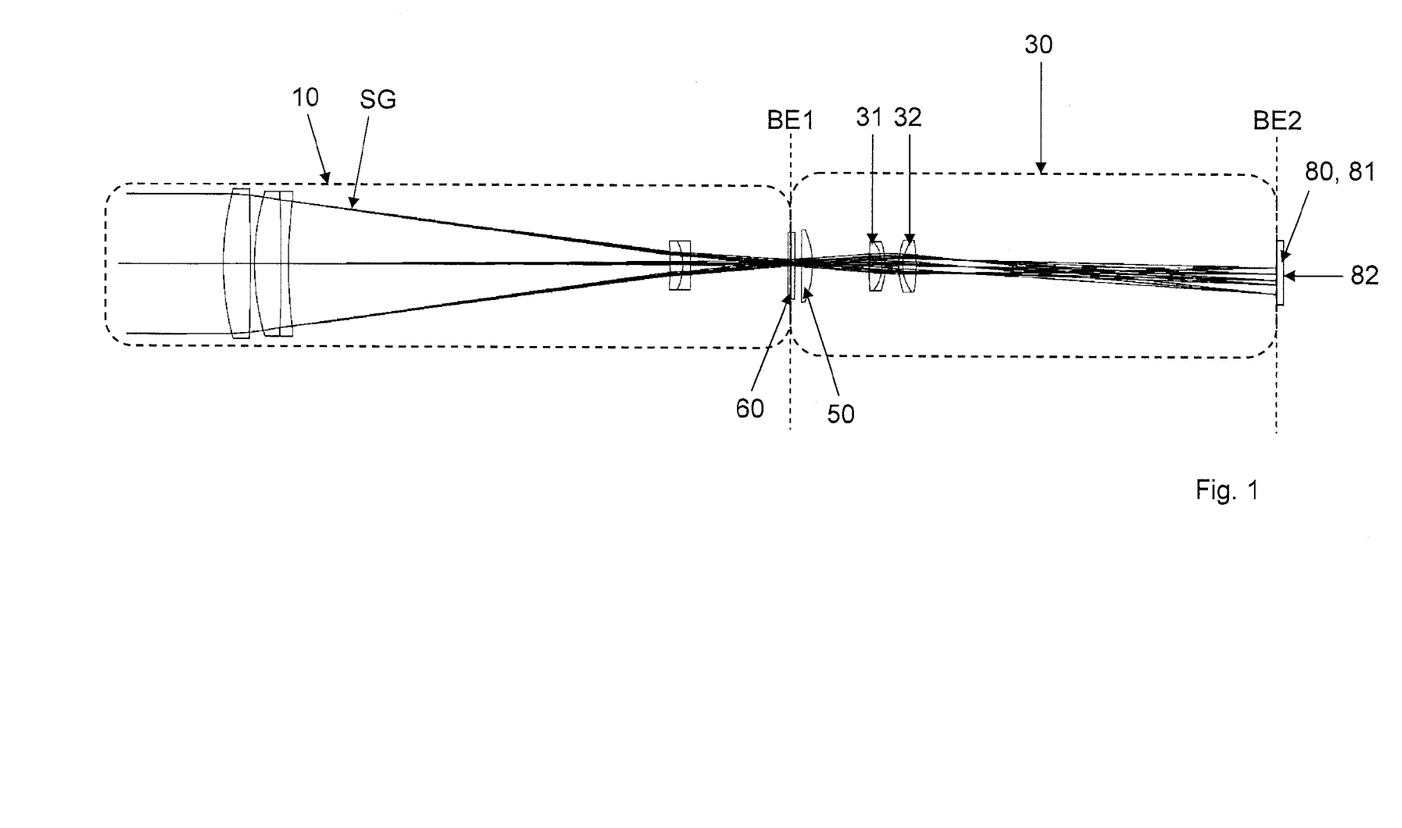
FIG. 1 shows an optical configuration of a sighting telescope fitted with an optical unit.

FIG. 1 shows an optical configuration for a sighting telescope comprising an objective 10 and a reversing system 30 fitted with two lens elements 31, 32. A first image plane BE1 is subtended between the objective 10 and the reversing system 30 and a second image plane BE2 is subtended on the said reversing system's side away from the objective 10. A reticle 60 is situated in the first image plane BE1 and a field lens 50 is situated between the reticle 60 and the lens elements 31, 32. A light beam SG runs through the said optical configuration. An intermediate image projected by the objective 10 onto the first image plane BE1 is erected and magnified in its reproduction on the second image plane BE2, an optical unit 80 fitted with a diffuser 81 being situated in said second image plane BE2. The image in the second image plane BE2 now can be viewed in a direction away from the reversing system 30 on a screen 82 or the like.

Figure 2:
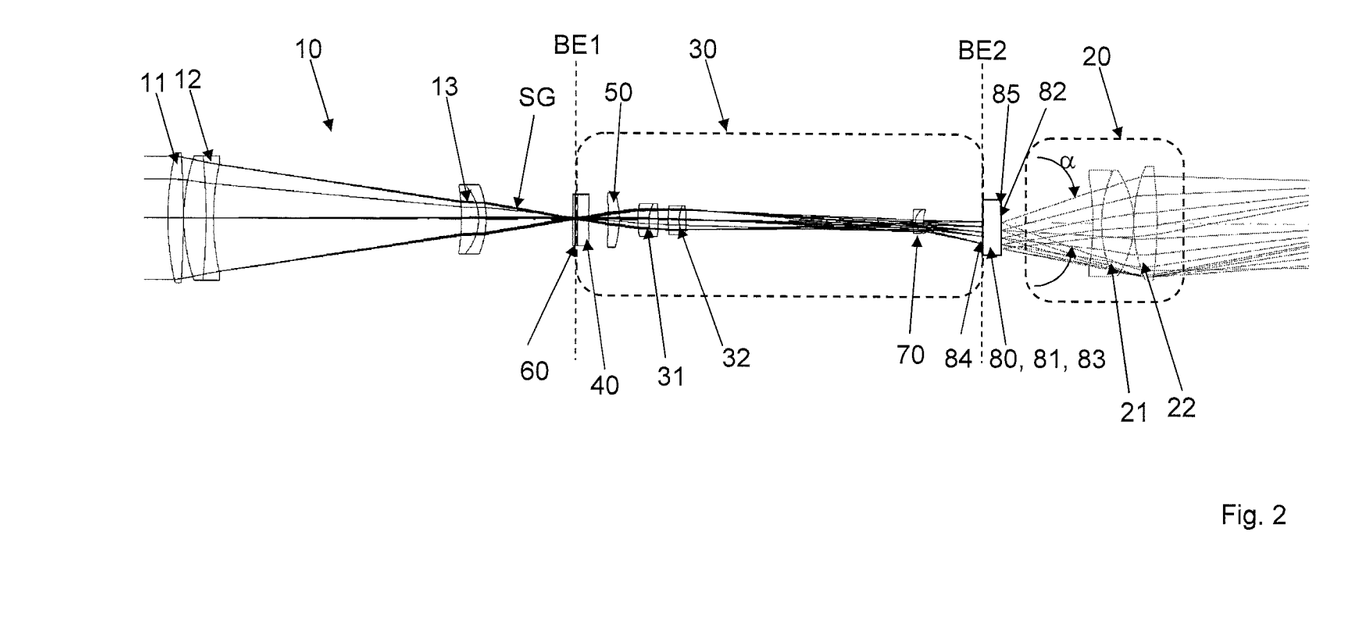
FIG. 2 shows an optical configuration of a sighting telescope fitted with an optical unit, an ocular, a correcting field lens element, a beam reversing system and achromats.

FIG. 2 shows an optical configuration for a sighting telescope comprising an objective 10 and a reversing system 30 comprising two lens elements 31, 32. A first image plane BE1 is subtended between the objective 10 and the reversing system 30 and a second image plane BE2 is subtended at said reversing system's side far away from the objective 10.

Said objective 10 consists of an objective lens element 11, of a first objective achromat 12 configured between the objective lens element 11 and the first image plane BE1, and of a second objective achromat 13 configured between the first objective achromat 12 and the first image plane BE1. Moreover a reticle 60 situated in the first image plane BE1 is cemented on the side away from the objective 10 to a correcting field lens element 40. A field lens 50 is situated between the two lens elements 31, 32 the correction field lens 40, and a beam deflecting unit 70 is situated between the two lens elements 31, 32 on one hand and the second image plane BE2.

A beam SG runs through the optical configuration. An image projected from the objective 10 into the first image plane BE1 is erect and reproduced enlarged in the second image plane BE2 which contains an optical unit 80 fitted with a diffuser 81. This diffuser 81 is designed as a matte plate 83 comprising a plane matte first surface 84 and a plane polished second surface 85. The first surface 84 is situated in the second image plane BE2 and the second surface 85 is situated at the side of the second image plane BE2 away from the reversing system 30.

From the direction of the optical unit 80 away from the reversing system 30, the image in the second image plane BE2 can now already be viewed, in principle without further components, on a kind of screen 82. For clarity of exposition however, the drawing shows an additional ocular 20 which is mounted precisely on said side (away from the reversing system 30) of the optical unit 80. Said ocular 20 is constituted by an ocular lens element 21 and an ocular achromat 22 mounted between the ocular lens element 21 and the optical unit 80.

The matte plate 83 subtends a radiation angle α designed in a manner that the numerical aperture—pointing away from the reversing system 30—of the intermediate image in the second image plane BE2 is larger than the numerical aperture on the side of the reversing system 30. In especially advantageous manner, the radiation angle α is equal to or larger than a numerical aperture of the adjoining ocular, and this features also is especially preferred at the maximum sighting telescope magnification. As a result the exit pupil diameter equals that of the numerical aperture of the ocular 20.

The first lens element 31 is displaceably mounted and situated on the objective side in the reversing system 30 and the second lens element 32 is displaceably mounted on the side of the second image plane BE2 of this reversing system. Consequently the intermediate image projected into the first image plane BE1 is reproduced with adjustable magnification into the second image plane BE2. By means of the radiation angle α, the numerical aperture of the intermediate image of the second image plane BE2 is widened in the shown magnification setting to a radiation angle α which approximately corresponds to the maximum numerical aperture of the ocular 20. In such a case the exit pupil's diameter is the largest possible for the ocular 20 being used. As a result the marksman is able to observe the complete intermediate image even when he is substantially off the optic axis. In critical situations, the human eye can therefore be positioned much faster in an appropriate position relative to the exit pupil and therefore a target can be acquired especially swiftly. Also the stress in observing the shooting range is reduced by shortening the time of observation.

Figure 3:
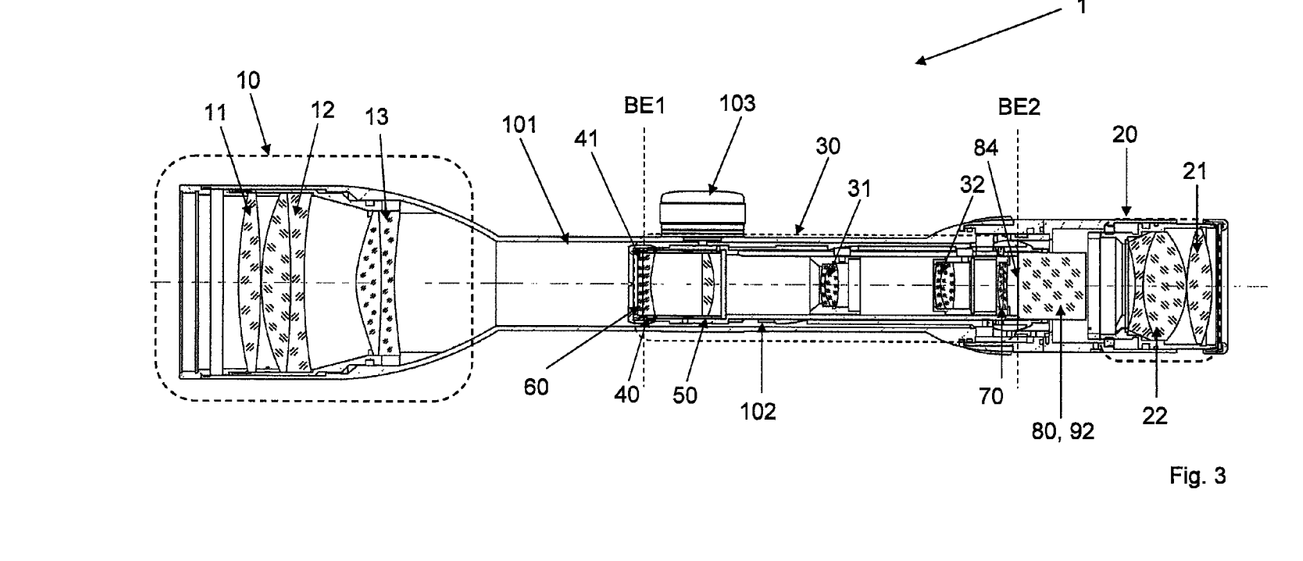
FIG. 3 shows a sighting telescope fitted with an optical unit, an ocular, a correcting field lens element, a beam reversing system and achromats.

FIG. 3 shows a sighting telescope 1 of which the housing 101 receives an objective 10 and a reversing system 30. The reversing system 10 comprises a tubular casing 102 displaceable by an adjusting wheel 103 within the housing 101. Two axially displaceable lens elements 31, 32 are mounted within the tubular casing 102. A first image plane BE1 is subtended between the objective 10 and the reversing system 30 and a second image plane BE2 is subtended on the side of the reversing system 30 which is away from the objective 10.

The objective 10 is made of an objective lens element 11, an objective achromat 12 configured between said lens element 11 and the first image plane BE1 and a second objective achromat 13 situated between the first objective achromat 12 and the image plane BE1. The objective lens element 11, the first objective achromat 12 and the second objective achromat 13 each are affixed in the housing 101, though alternatively they also may be displaceable therein to allow parallax adjustment. Also, a reticle 60 is configured in the first image plane BE1 and is connected to the tubular casing 102. On its side away from the objective 10, the reticle 60 is cemented to a correcting field lens element 40 which also is affixed in the tubular casing 102. a field lens 50 affixed into the tubular casing 102 is situated between the two lens elements 31, 32 on one hand and the correcting field lens element 40 on the other, further between said lens elements 31, 32 and the second image plane BE2 is situated a beam deflecting lens 70

An intermediate image projected by the objective 10 into the first image plane BE1 is shown erect and enlarged in the second image plane BE2 in which is situated an optical unit 80 affixed to the tubular casing 101. This optical unit 80 consists of a beam splitter 92 fitted with a plane, matte first surface 84. This first surface is situated in the second image plane BE2 and the remainder of the beam splitter 92 is situated on the side away from the reversing system 30 of the second image plane BE2.

An ocular 20 received in the housing 101 is used to observe the image in the second image plane BE2 of the optical unit 80 from the direction away from the reversing system 30. This ocular 20 is configured on the side of the optical unit 80 which is away from the reversing system 30. Said ocular consists of an ocular lens element 21 and an ocular achromat 22 configured between the ocular lens 21 and the optical unit 80. Both the ocular lens element 21 and the ocular achromat 22 are affixed in the housing 101.

The first lens element 31 is displaceably mounted in the reversing system 30 and on the side of the objective and the second lens element 32 is displaceably mounted in said reversing system on the side of the second image plane BE2. As a result, the intermediate image projected from the first image pane BE1 is reproduced at variable magnification in the second image plane BE2 and is visible through the ocular 20.

Figure 4:
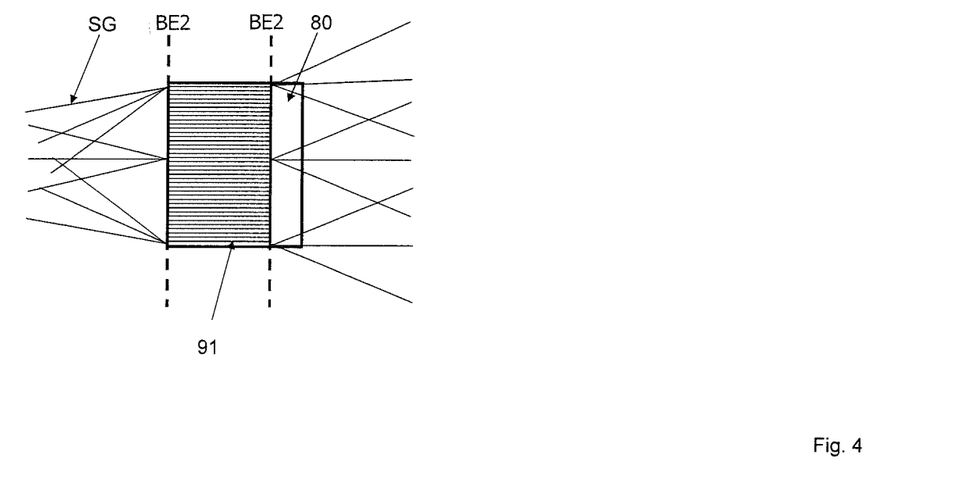
FIG. 4 is a cutaway view of an optical configuration of a sighting telescope fitted with an optical unit and a fiber optics.

FIG. 4 shows a cutaway view of an optical array for a sighting telescope comprising an optical unit 80 and a fiber optics 91. This fiber optics 91 is situated in the second image plane BE2. In particular the fiber optics 91 abuts the second image plane BE2 on the side away from a reversing system. Due to the fiber optics, the input-side image of a beam SG in the second image plane BE2 corresponds to that of the back side of the fiber optics 91. At the output side, the fiber optics 91 abuts the optical unit 80, as a result of which the image present in the image plane BE2 is made visible.

In the case under consideration, therefore, the image at the input of the fiber optics 91 corresponds to the image at this fiber optics' output. However, basically, the individual fibers of the fiber optics 91 may not run parallel to the optic axis of optical unit. In the case of an appropriate design, the fibers may run in such a way that the fiber optics shall reverse an image. In this manner the fiber optics might constitute a reversing system. Then the fiber optics 91 would run from a first image plane to the second image plane BE2.

Figure 5:
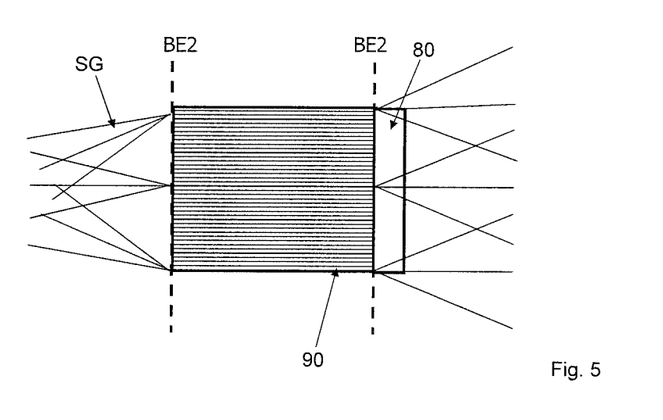
FIG. 5 is a cutaway view of an optical configuration of a sighting telescope fitted with an optical unit and an image intensifier.

FIG. 5 is a cutaway view of a sighting telescope's optical unit 80 and an image intensifier 90. The optical unit 80 is situated on one side of a second image plane BE2. The image intensifier 90 is located on the other side. Said intensifier extends the second image plane BE2 in a manner that it guides and additionally intensifies the rays of a beam SG entering the first side along individual fibers to a second side. In the instance shown, the image at the input to the fiber optics 91 corresponds to that at the fiber output of said fiber optics 91 regarding geometry and orientation. However the incident light was intensified for such an outcome.

Figure 6:
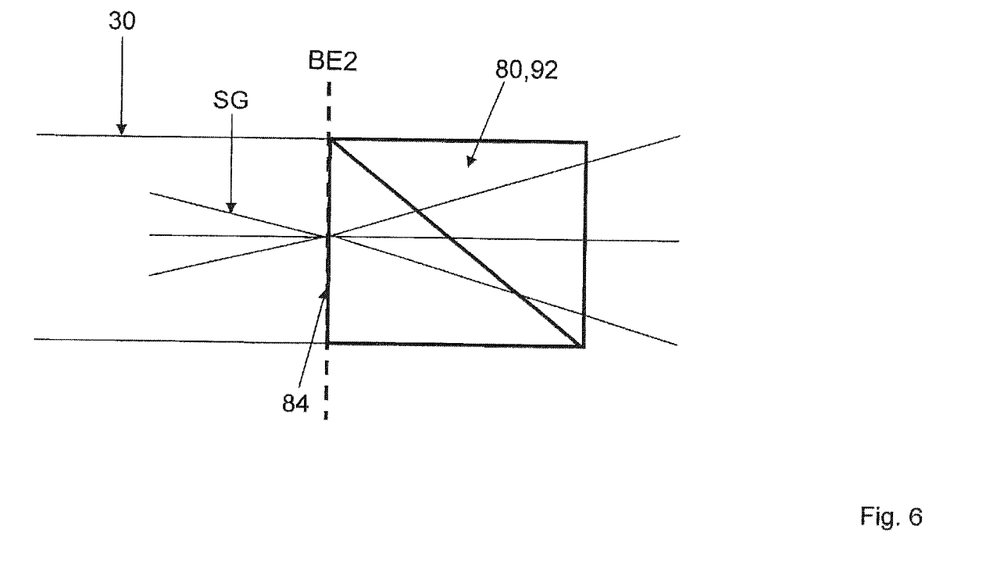
FIG. 6 is a cutaway view of an optical configuration of a sighting telescope fitted with an optical unit and a beam splitter.

FIG. 6 is a cutaway view of an optical array for a sighting telescope comprising an optical unit 80, a reversing system indicated by 30, and a beam splitter 92. The beam splitter 92 constitutes the optical unit 80 in that the side of the beam splitter 92 situated in a second image plane BE2 is a matte first surface 84. The reversing system 30 is mounted on the side of the second image plane BE2 that is opposite the beam splitter 92. A beam SG passes through the cutout of the optical unit.

The present invention is not restricted to any of the above discussed embodiment modes, on the contrary is may be modified in versatile manner.

All features and advantages, inclusive design details, spatial configurations and procedural steps, may be construed being inventive per se or in arbitrary combinations.

LIST OF REFERENCE SYMBOLS.

| | |
|---|---|
| 1 | sighting telescope |
| 10 | objective |
| 11 | objective lens element |
| 12 | first objective achromat |
| 13 | second objective achromat |
| 20 | ocular |
| 21 | ocular lens element |
| 22 | ocular achromat |
| 30 | reversing system |
| 31 | first lens element |
| 32 | second lens element |
| 40 | correcting field lens element |
| 50 | field lens |
| 60 | reticle |
| 70 | beam diverging lens/beam deflecting unit |
| 80 | optical unit |
| 81 | diffuser |
| 82 | screen |
| 83 | matte plate |
| 84 | first surface |
| 85 | second surface |
| 90 | image intensifier |
| 91 | fiber optics |
| 92 | beam splitter |
| 101 | housing |
| 102 | casing |
| 103 | adjusting wheel |
| BE1 | first image plane |
| BE2 | second image lane |
| SG | beam (path) |
| α | radiation angle |

The invention claimed is:

1. A sighting telescope (1) comprising an objective (10), a reversing system (30), a first image plane being (BE1) configured between the objective (10) and the reversing system (30), and a second image plane (BE2) being configured on that side of the reversing system (30) which is away from the objective (10), and where an intermediate image projected from the objective (10) into the first image plane (BE1) is reproduced as a second image erected in the second image plane (BE2)

characterized in that on the side of the reversing system (30) away from the objective (10), an optical unit (80) is configured to make visible, on the optical unit, the second image present in the second image plane (BE2), wherein the optical unit (80) is a diffuser (81), wherein the diffuser (81) is a holographic element.

2. Sighting telescope (1) as claimed in claim 1, characterized in that the optical unit (80) is configured in the second image plane (BE2).

3. Sighting telescope (1) as claimed in claim 1, characterized in that a reticle (60) is configured in the first image plane (BE1) or that the optical unit (80) is fitted with a reticle (60).

4. Sighting telescope (1) as claimed in claim 1, characterized in that the reversing system (30) comprises a first lens element (31) and a second lens element (32).

5. Sighting telescope (1) as claimed in claim 4, characterized in that a beam diverging means (70) is mounted between the second lens element (32) and the second image plane (BE2).

6. Sighting telescope (1) as claimed in claim 1, characterized in that the reversing system (30) is a fiber optics running from the first image plane (BE1) to the second image plane (BE2).

7. Sighting telescope (1) as claimed in claim 1, characterized in that an ocular (20) is configured on that side of the second image plane (BE2) which points away from the reversing system (30).

8. Sighting telescope (1) as claimed in claim 1, characterized in that the optical unit (80) subtends a radiation angle (a) such that the numerical aperture of the intermediate image present in the second image plane (BE2) facing away from the reversing system (30) is larger than the numeric aperture at the side facing the reversing system.

9. Sighting telescope (1) as claimed in claim 1, characterized in that the first surface (84) is configured in the second image plane (BE2).

10. Sighting telescope (1) as claimed in claim 1, characterized in that the first surface (84) is made by etching or grinding or is a microstructure.

11. Sighting telescope (1) as claimed claim 1, characterized in that the second surface (85) is configured on the side of the second image plane (BE2) away from the reversing system (30).

12. Sighting telescope (1) as claimed in claim 4, characterized in that the first lens element (31) is displaceable and configured at the objective side in the reversing system (30) and the second lens element is displaceable and configured on sides of the second image plane (BE2) in the reversing system (30), as a result of which the intermediate image projected into the first image plane (BE1) is reproduced at variable magnification in the second image plane (BE2).

13. Sighting telescope (1) as claimed in claim 1, characterized in that the correcting field lens (40) is situated in the first image plane (BE1).

14. Sighting telescope (1) as claimed in claim 5, characterized in that the beam diverging means (70) is a beam diverging lens element.

15. Sighting telescope (1) as claimed in claim 1, wherein the correcting field lens corrects chromatic aberrations.

16. Sighting telescope (1) as claimed in claim 1, wherein a fiber optics (91) is situated in the second image plane (BE2), the fiber optics (91) abuts the second image plane (BE2) on the side facing away from the reversing system (30), and the fiber optics (91) abuts the optical unit (80) on an output side of the fiber optics (91).

17. Sighting telescope (1) as claimed in claim 1, wherein a field lens (50) is situated between a first lens element (31) and the first image plane (BE1).

18. Sighting telescope (1) as claimed in claim 17, wherein a correcting field lens (40) is configured between the field lens (50) and the first image plane (BE1).

19. Sighting telescope (1) as claimed in claim 18, wherein the correcting field lens (40) is situated in the first image plane (BE1).

* * * * *